June 9, 1931.　　　C. G. HILGENBERG　　　1,808,955
MULTIPLE NECK GAUGE FOR BOTTLES
Filed April 10, 1930
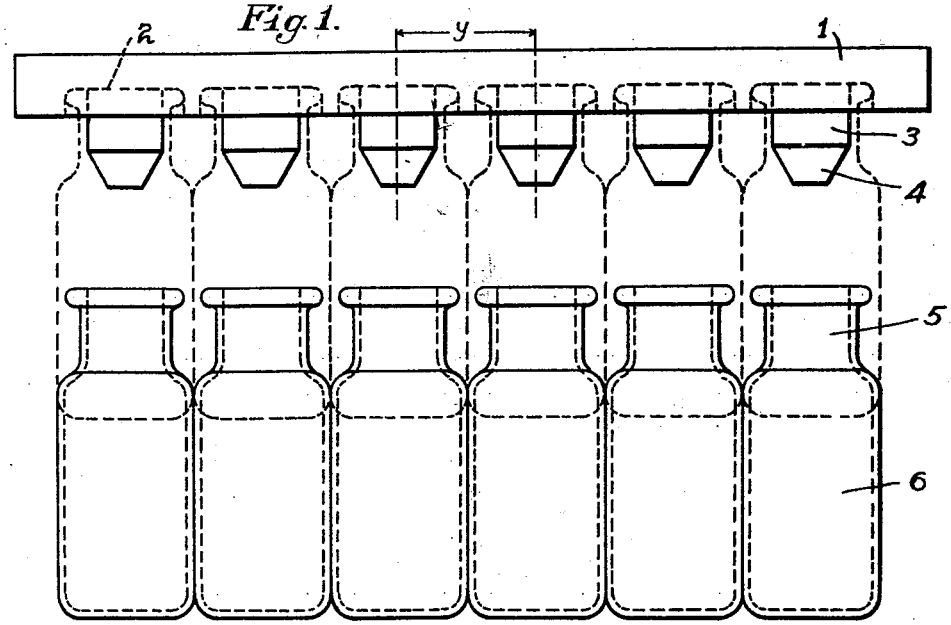
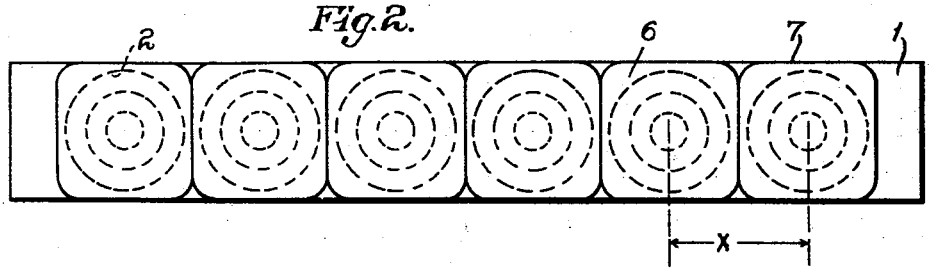
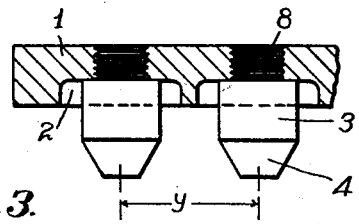
INVENTOR
Carl G. Hilgenberg
by
William B. Jaspert
Attorney Patented June 9, 1931

1,808,955

UNITED STATES PATENT OFFICE

CARL G. HILGENBERG, OF BALTIMORE, MARYLAND

MULTIPLE NECK GAUGE FOR BOTTLES

Application filed April 10, 1930. Serial No. 443,063.

This invention relates to gauges, more particularly to gauges especially applicable for use in the inspection of bottles or similar ware.

The present invention is directed to a gauge or a plurality of gauges which are especially useful for the inspection of bottles made by continuous process in which the bottles are continuously conveyed through an annealing lehr.

Heretofore, bottles have been inspected individually for uniformity and quality, and where the neck opening and outside diameter was required to be accurate and of a certain dimension, a separate gauge was employed to inspect each bottle by either inserting the gauge therein or over it.

In accordance with the present invention, a series of gauges are attached in spaced relation to a support in such manner that the spacing of the gauges corresponds to the center-to-center distance of a plurality of bottles placed with their adjacent sides in contact. In this manner the bottles may be gauged or inspected by the operator while unloading them from the lehr conveyor, since it provides for the gauging of as many bottles at one time as is practical to be gripped in the operator's hands. The gauge may be secured to some portion of the annealing lehr or at a convenient place adjacent thereto to facilitate the handling of bottles while they are unloaded, inspected, and placed in a suitable packing receptacle.

These features of the invention will become more apparent from a consideration of the drawings in which like reference characters designate like parts and in which Fig. 1 is an elevational view of a series of gauges embodying the principles of this invention, diagrammatically illustrating the manner of its application to the inspection of bottles; Figure 2 is a bottom plan view and Figure 3 a sectional elevational view of a pair of the gauging members.

With reference to Figure 1 of the drawings, 1 generally designates a plurality of counterbored cylindrical holes 2 with fixed and uniform distances Y therebetween; 3 a plug having a cylindrical body with chamfered or tapered ends 4 centered and secured in the counterbored holes 2 of the support 1.

In the drawings, six such gauges are shown on the support 1 which latter may, for convenience, be secured to the side of a glass annealing lehr. The counterbored holes 2 with the plugs 3 act as gauges for the outside diameter of the necks 5 of bottles 6 having square sides 7 as shown in Figure 2. The cylindrical plug 3 is of a diameter corresponding to the inner dimension of the necks 5 of bottles 6.

The bottles are arranged by gripping three in each hand and holding them in alinement as shown in Figure 2. The operator, to inspect the bottles, disposes them over the plugs 3 which by means of their tapered ends 4 readily pilot the necks in their proper position, and if the neck openings and outside diameter are of proper size, the bottles will all come to rest against the plug support, as shown by the dotted lines in Figure 1 of the drawings.

With reference to Figure 3, it will be seen that the spacing Y of the plugs correspond to the spacings X of contiguous bottles, the distance X being the center-to-center distance of the bottles when placed in contact with each other. The plug 3 may be secured to the support 1 in various ways but preferably by providing a screw shank 8 having threads for cooperation with threaded openings provided in the member 1 to permit the ready removal or replacement of the plugs when it is desired to change over to another size.

The operator inspecting the bottles or ware, removes three bottles in each hand from the lehr and twirls them around with his thumb to inspect their surface contours and to search for flaws in the glass. He then brings them in contact with the plug gauges as shown in Figure 1 and any defective ware is readily detected and thrown on the scrap heap.

The use of a series of gauges, in spaced relation, corresponding to the center distance of the ware, provides for the inspection of a large number of bottles in a minimum period of time and in a very thorough manner, and although the gauges are illustrated in the drawings as arranged in a row and as comprising six in number, it will be evident that a series of such gauges may be arranged in transverse planes to form a rectangular spacing, or four, three or two gauges may be used in series if desired.

It is also apparent that the arrangement of gauges herein employed may be utilized for the inspection of bottles of cylindrical or other shapes.

I claim:

1. A gauge for inspecting bottles comprising a base having a recess of the shape and dimensions of the outer periphery of the bottle neck and a plug disposed centrally of said recess for gauging the opening in said neck.

2. A gauge for inspecting bottles comprising a base having a plurality of recesses of the shape and dimensions of the outer periphery of the bottle necks, and plugs disposed centrally of said recesses for gauging the openings in said necks, said recesses and plugs being spaced to correspond to the center distances of the bottles when inserted in said recesses and with adjacent bottles in contact.

In testimony whereof I have hereunto set my hand this 7 day of April, 1930.

CARL G. HILGENBERG.